(12) United States Patent
Takeuchi (10) Patent No.: US 6,574,876 B2
(45) Date of Patent: Jun. 10, 2003

(54) APPARATUS FOR DETECTING ROTATIONAL ANGLE

(75) Inventor: Shuichi Takeuchi, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 09/908,617

(22) Filed: Jul. 18, 2001

(65) Prior Publication Data

US 2002/0020070 A1 Feb. 21, 2002

(30) Foreign Application Priority Data

Jul. 19, 2000 (JP) ........................................ 2000-219530

(51) Int. Cl.[7] .............................................. G01B 11/26
(52) U.S. Cl. ........................................ 33/1 PT; 33/707
(58) Field of Search ................................. 33/1 N, 1 PT, 33/264, 534, 600, 707

(56) References Cited

U.S. PATENT DOCUMENTS

| 4,263,506 | A | | 4/1981 | Epstein | |
|---|---|---|---|---|---|
| 4,414,754 | A | * | 11/1983 | Lapeyre | ........................ 33/707 |
| 4,530,155 | A | * | 7/1985 | Burkhardt et al. | ............ 33/707 |
| 5,091,643 | A | | 2/1992 | Okutani et al. | ........ 250/231.14 |
| 6,093,928 | A | * | 7/2000 | Ohtomo et al. | ................ 33/707 |
| 6,158,132 | A | * | 12/2000 | Kofink et al. | ................ 33/1 PT |
| 6,170,162 | B1 | * | 1/2001 | Jacobsen et al. | ............ 33/1 PT |
| 6,298,565 | B1 | * | 10/2001 | Weber et al. | ................ 33/1 N |
| 6,311,401 | B1 | * | 11/2001 | Neckel et al. | ................ 33/1 N |

FOREIGN PATENT DOCUMENTS

| EP | 0184286 | 6/1986 | .......... G01D/5/249 |
|---|---|---|---|
| EP | 0911611 | 4/1999 | .......... G01D/5/249 |
| GB | 2189663 | 10/1987 | ............ H03M/1/28 |

* cited by examiner

Primary Examiner—G. Bradley Bennett
(74) Attorney, Agent, or Firm—Synnestvedt & Lechner LLP (57) ABSTRACT

A relative rotational angle of a rotary body is measured with respect to a reference angle. A disk rotates integrally with the rotary body. First openings are arranged about the entire circumference of the disk and spaced from one another by a predetermined pitch. A first detecting element detects the first openings and generates a first binary code. Second openings are arranged concentrically with the first openings. A second detecting element detects the second openings and generates a second binary code. A CPU computes a relative rotational angle of the rotary body in accordance with the first binary code and initializes the reference rotational angle of the rotary body in accordance with the second binary code. When the first detecting element generates the first binary code, the CPU determines the reference angle based on a combination of the first and second binary codes stored by a ROM.

13 Claims, 8 Drawing Sheets

| No. | Rotational Angle Data (°) | Rotary Disk Pattern Position | Relative Angle | \multicolumn{8}{c|}{Bit Code} | Output (Decimal) (Decimal of 8-bit Code) |
|---|---|---|---|---|---|---|---|---|---|---|---|---|
| | | | | 3rd | 4th | 5th | 6th | 7th | 8th | 1st | 2nd | |
| 0 | 0.0 | 0 | 0 | 0 | 0 | 0 | 1 | 1 | 0 | 0 | 0 | 24 |
| 1 | 1.5 | 1 | 0 | 1 | 0 | 1 | 0 | 1 | 1 | 0 | 1 | 173 |
| 2 | 3.0 | 1 | 1 | 1 | 0 | 1 | 1 | 1 | 0 | 1 | 1 | 187 |
| 3 | 4.5 | 1 | 1 | 1 | 0 | 1 | 0 | 0 | 1 | 1 | 0 | 166 |
| 4 | 6.0 | 0 | 0 | 0 | 1 | 0 | 0 | 0 | 0 | 0 | 0 | 64 |
| 5 | 7.5 | 0 | 0 | 0 | 0 | 1 | 1 | 0 | 0 | 0 | 1 | 49 |
| ⋮ | ⋮ | ⋮ | | | | | ⋮ | | | | | |
| 8 | 12.0 | 0 | 0 | 0 | 1 | 0 | 0 | 1 | 0 | 0 | 0 | 72 |
| ⋮ | ⋮ | ⋮ | | | | | ⋮ | | | | | |
| 10 | 15.0 | 0 | 1 | 0 | 1 | 1 | 0 | 0 | 1 | 1 | 1 | 103 |
| ⋮ | ⋮ | ⋮ | | | | | ⋮ | | | | | |
| 12 | 18.0 | 1 | 0 | 1 | 1 | 1 | 0 | 1 | 0 | 0 | 0 | 232 |
| ⋮ | ⋮ | ⋮ | | | | | ⋮ | | | | | |
| 15 | 22.5 | 1 | 1 | 1 | 1 | 0 | 0 | 1 | 0 | 1 | 0 | 202 |
| 16 | 24.0 | 0 | 0 | 0 | 1 | 1 | 1 | 0 | 0 | 0 | 0 | 112 |
| ⋮ | ⋮ | ⋮ | | | | | ⋮ | | | | | |
| 20 | 30.0 | 1 | 0 | 1 | 0 | 0 | 1 | 0 | 0 | 0 | 0 | 144 |
| ⋮ | ⋮ | ⋮ | | | | | ⋮ | | | | | |
| 24 | 36.0 | 0 | 0 | 0 | 0 | 1 | 1 | 0 | 0 | 0 | 0 | 48 |
| 25 | 37.5 | 0 | 0 | 0 | 0 | 1 | 0 | 0 | 0 | 0 | 1 | 33 |
| ⋮ | ⋮ | ⋮ | | | | | ⋮ | | | | | |
| 28 | 42.0 | 1 | 0 | 1 | 0 | 1 | 0 | 0 | 0 | 0 | 0 | 160 |
| ⋮ | ⋮ | ⋮ | | | | | ⋮ | | | | | |
| 32 | 48.0 | 1 | 0 | 1 | 0 | 1 | 1 | 1 | 1 | 0 | 0 | 188 |
| ⋮ | ⋮ | ⋮ | | | | | ⋮ | | | | | |
| 36 | 54.0 | 0 | 0 | 0 | 0 | 1 | 0 | 0 | 0 | 0 | 0 | 32 |
| ⋮ | ⋮ | ⋮ | | | | | ⋮ | | | | | |
| 40 | 60.0 | 0 | 0 | 0 | 0 | 0 | 0 | 0 | 1 | 0 | 0 | 4 |
| ⋮ | ⋮ | ⋮ | | | | | ⋮ | | | | | |
| 44 | 66.0 | 0 | 0 | 0 | 0 | 0 | 0 | 1 | 1 | 0 | 0 | 12 |
| ⋮ | ⋮ | ⋮ | | | | | ⋮ | | | | | |
| 48 | 72.0 | 0 | 0 | 0 | 0 | 1 | 1 | 1 | 0 | 0 | 0 | 56 |
| ⋮ | ⋮ | ⋮ | | | | | ⋮ | | | | | |
| 52 | 78.0 | 1 | 0 | 1 | 1 | 1 | 1 | 1 | 0 | 0 | 0 | 248 |
| ⋮ | ⋮ | ⋮ | | | | | ⋮ | | | | | |

APPARATUS FOR DETECTING ROTATIONAL ANGLE

BACKGROUND OF THE INVENTION

The present invention relates to apparatuses for detecting a rotational angle, and, more particularly, to apparatuses for detecting the rotational angle of a steering wheel of a vehicle.

Figure 6:
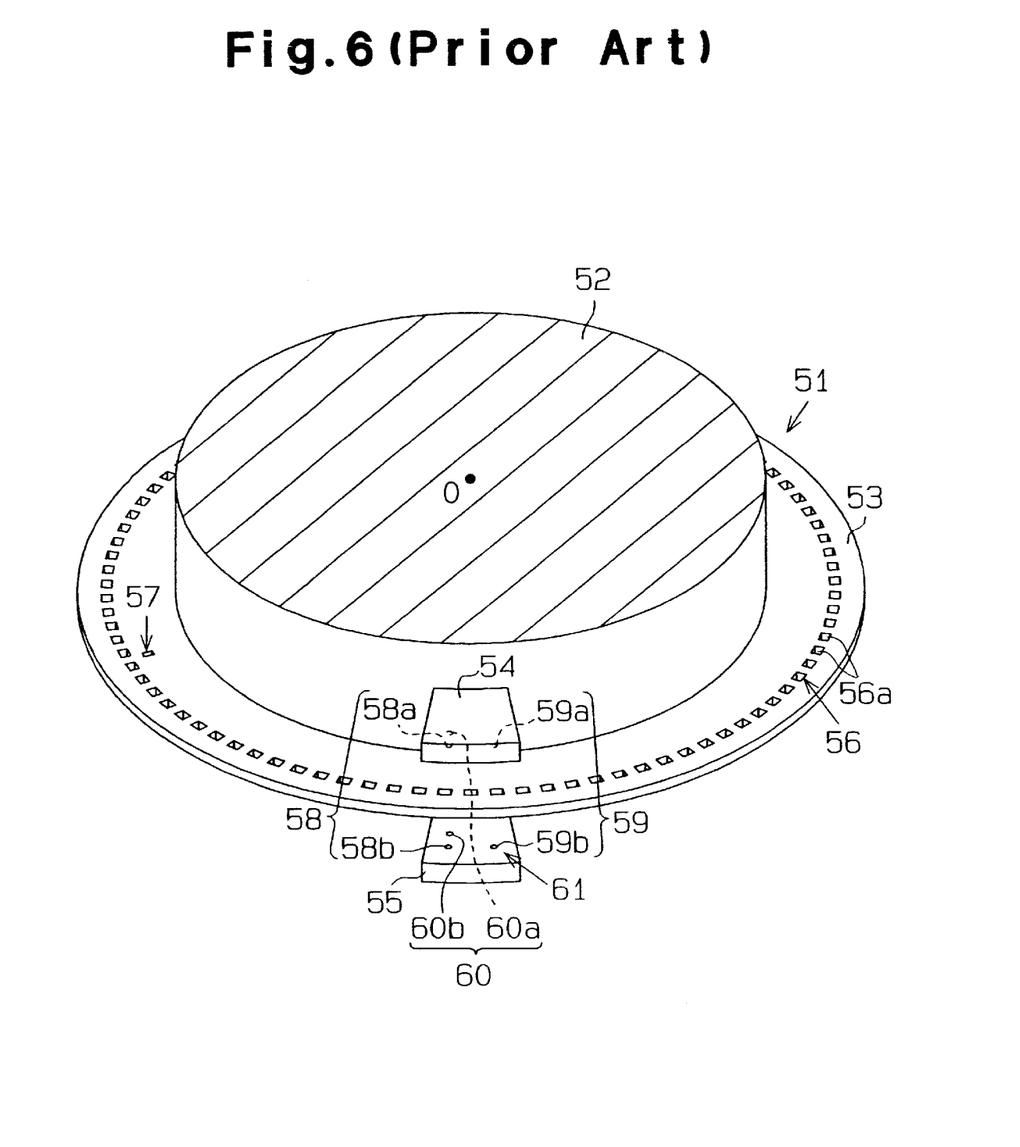
FIG. 6 is a perspective view showing a prior art rotational angle rotating apparatus.
Figure 7:
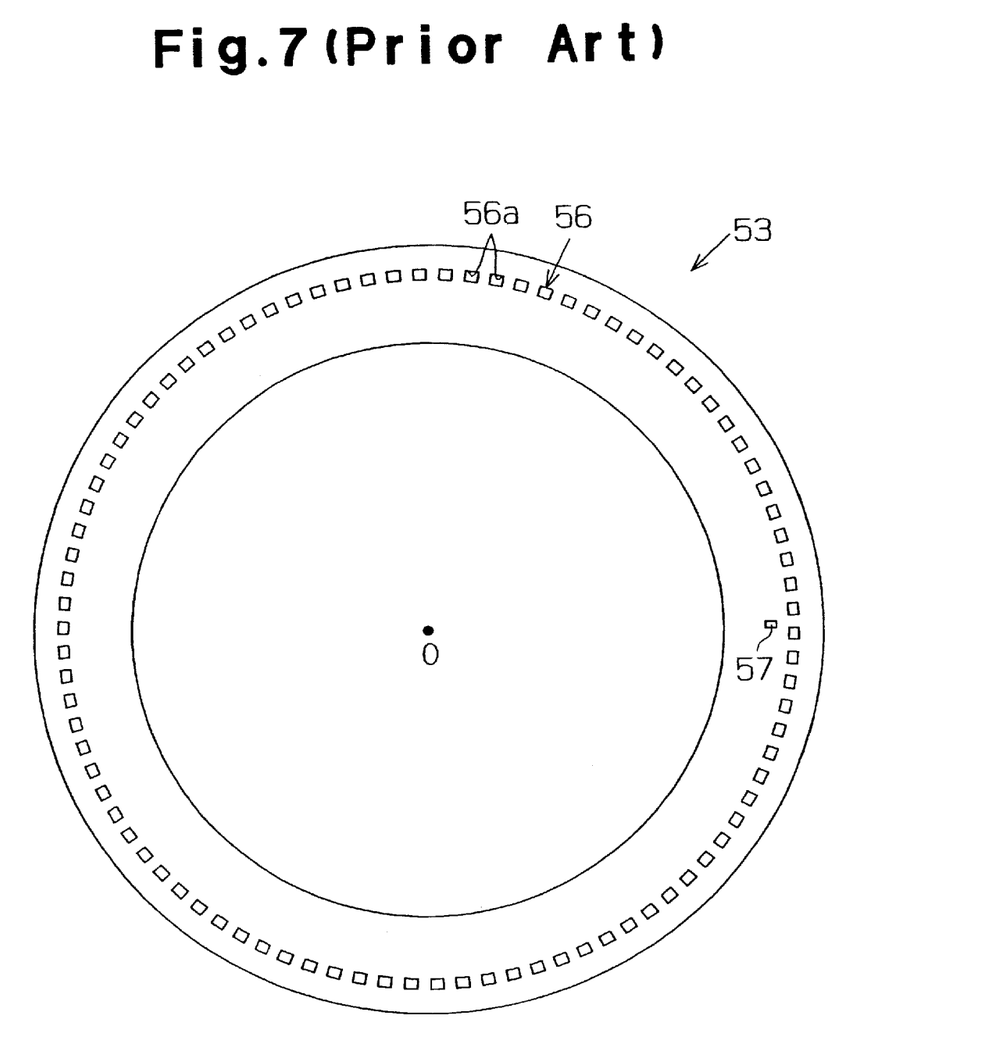
FIG. 7 is a plan view showing a rotary disk of the rotational angle detecting apparatus of FIG. 6.

FIG. 6 shows a prior art rotational angle detecting apparatus 51. The rotational angle detecting apparatus 51 includes a first detecting piece 54 and a second detecting piece 55 that oppose each other. A rotary disk 53 is located between the first and second detecting pieces 54, 55 and is secured to a steering shaft 52. An opening group 56 is located at an outer circumferential portion of the rotary disk 53. The opening group 56 is used for detecting a relative angle of the steering shaft 52, or the angle by which the rotary disk 53 is rotated relative to a reference position. The opening group 56 is located along a circle the center of which corresponds to point O. The opening group 56 includes a plurality of openings 56a that extend through the rotary disk 53 and are separated from adjacent openings 56a at equal intervals. As shown in FIG. 8, the circumferential dimension W1 of each opening 56a is equal to the interval W2 between adjacent openings 56a. As shown in FIGS. 6 and 7, an opening 57 extends through the rotary disk 53 and is located radially inward from the opening group 56. That is, the opening 57 is located on a circle that is coaxial with the circle along which the openings 56a are located. The opening 57 is used for determining the reference position of the rotary disk 53.

The first detecting piece 54 includes a first light emitting element 58a and a second light emitting element 59a. The first and second light emitting elements 58a, 59a are located at positions corresponding to a path defined by the opening group 56 when the rotary disk 53 rotates. The first piece 54 includes a third light emitting element 60a located at a position corresponding to a path defined by the opening 57 when the rotary disk 53 rotates. The second detecting piece 55 includes a first light receiving element 58b and a second light receiving element 59b, which oppose the first light emitting element 58a and the second light emitting element 59a, respectively. The second detecting piece 55 includes a third light receiving element 60b that opposes the third light emitting element 60a.

The first light emitting element 58a and the first light receiving element 58b form a first detector 58. In the same manner, the second light emitting element 59a and the second light receiving element 59b form a second detector 59. The first and second detectors 58, 59 form a rotational angle sensor 61 that detects the angle by which the steering shaft 52, or the rotary disk 53, is rotated. Further, the third light emitting element 60a and the third light receiving element 60b form a reference position sensor 60. The reference position sensor 60 detects that the rotary disk 53 is located at the reference position.

The first detector 58 of the angle sensor 61 generates a binary code depending on whether or not the rotary disk 53 blocks the first light emitting element 58a from the first light receiving element 58b. Likewise, the second detector 59 of the angle sensor 61 generates a binary code depending on whether or not the rotary disk 53 blocks the second light emitting element 59a from the second light receiving element 59b. Thus, the rotational angle sensor 61 generates a two-bit code depending on whether or not each detector 58, 59 faces any opening 56a of the opening group 56.

Figure 8A:
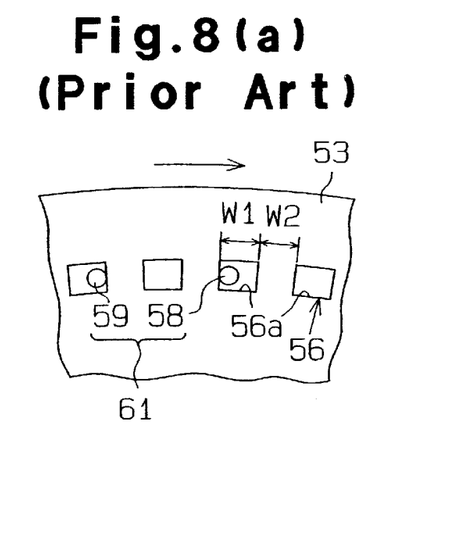
FIG. 8(a) is a plan view showing a portion of the rotary disk of FIG. 7 in a rotational angle detecting state.
Figure 8B:
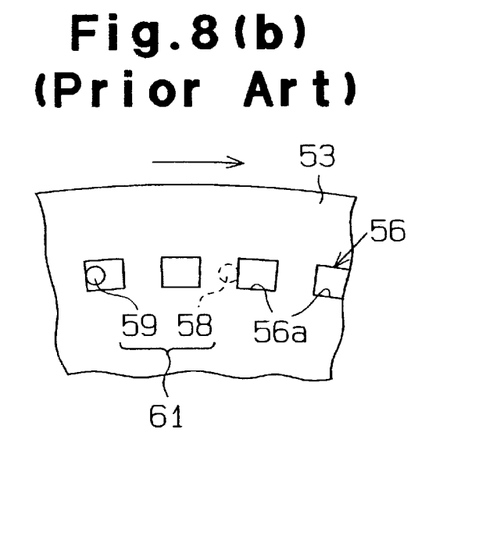
FIG. 8(b) is a plan view showing a portion of the rotary disk of FIG. 7 in another rotational angle detecting state when the rotary disk is rotated in the direction indicated by the arrow from the state of FIG. 8(a)
Figure 8C:
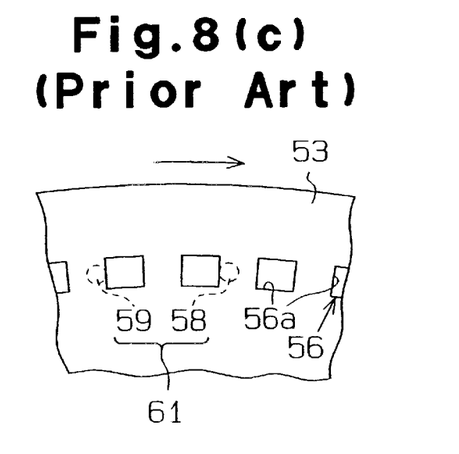
FIG. 8(c) is a plan view showing a portion of the rotary disk of FIG. 7 in another rotational angle detecting state when the rotary disk is rotated in the direction indicated by the arrow from the state of FIG. 8(b)
Figure 8D:
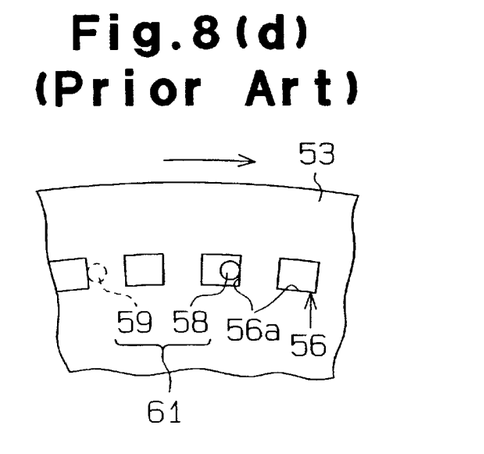
FIG. 8(d) is a plan view showing a portion of the rotary disk of FIG. 7 in another rotational angle detecting state when the rotary disk is rotated in the direction indicated by the arrow from the state of FIG. 8(c).

The first and second detectors 58, 59 are located relative to each other such that the phase of the binary code emitted by the second detector 59 is offset from the phase of the binary code emitted by the first detector 58 by a quarter cycle. More specifically, if the first and second detectors 58, 59 both face openings 56a, as shown in FIG. 8(a), the rotational angle sensor 61 generates a two-bit code "1•1". If the rotary disk 53 rotates from this state in a direction indicated by the arrow of FIG. 8(a) to block the first light emitting element 58a from the first light receiving element 58b, as shown in FIG. 8(b), the rotational angle sensor 61 generates a two-bit code "0•1". If the rotary disk 53 further rotates in the same direction to block both the first and second light emitting elements 58a, 59a from the associated light receiving elements 58b, 59b, as shown in FIG. 8(c), the rotational angle sensor 61 generates a two-bit code "0•0". If the rotary disk 53 further rotates in the same direction to block the second light emitting element 59a from the second light receiving element 59b, as shown in FIG. 8(d), the rotational angle sensor 61 generates a two-bit code "1•0". If the rotary disk 53 further rotates in the same direction, the first and second detectors 58, 59 both face corresponding openings 56a, thus restoring the state of FIG. 8(a). In other words, when the rotary disk 53 rotates in the direction indicated by the arrows of FIGS. 8(a) to 8(d), the rotational angle sensor 61 successively generates two-bit codes "1•1", "0•1", "0•0", and "1•0" in this order in a repeated manner. If the rotary disk 53 rotates in an opposite direction, the angle sensor 61 successively generates the two-bit codes in the opposite order.

Accordingly, the rotational direction of the rotary disk 53 is determined in accordance with the order in which the angle sensor 61 generates the two-bit codes. Further, the rotational angle of the rotary disk 53 is also detected in accordance with the angle of motion required to change the two-bit code. That is, if the rotational angle sensor 61 is configured to generate a two-bit code each time the rotational angle of the rotary disk 53 varies by one degree, the resolution of the rotational angle detecting apparatus 51 is one degree.

The reference position sensor 60 generates a binary code depending on whether or not the rotary disk 53 blocks the third light emitting element 60a from the third light receiving element 60b. More specifically, if the opening 57 is located between the third light emitting element 60a and the third light receiving element 60b, the reference position sensor 60 generates a binary code "1". Otherwise, the reference position sensor 60 generates a binary code "0".

In the rotational angle detecting apparatus 51, which is constructed as described above, operation is initiated by the reference position sensor 60. More specifically, if the reference position sensor 60 detects that the opening 57 is located between the third light emitting element 60a and the third light receiving element 60b, the corresponding angle at which the rotary disk 53 is rotated is defined as the reference angle (which is, for example, zero degrees). A memory of the rotational angle detecting apparatus 51 is thus initialized. Subsequently, the rotational angle sensor 61 generates a two-bit code depending on whether or not each detector 58, 59 faces any opening 56a. The rotational angle detecting apparatus 51 thus computes the rotational angle of the rotary disk 53 with respect to the reference angle in accordance with the two-bit code generated by the rotational angle sensor 61.

However, in the rotational angle detecting apparatus 51, the reference angle of the rotary disk 53 is determined only in accordance with the position of the opening 57. Thus, the memory of the rotational angle detecting apparatus 51 may not be initialized unless the rotary disk 53 is rotated at substantially 360 degrees. This complicates the initialization.

BRIEF SUMMARY OF THE INVENTION

Accordingly, it is an objective of the present invention to provide a rotational angle detecting apparatus that easily initializes a memory regarding a rotational angle of a rotary disk.

To achieve the foregoing and other objectives and in accordance with the purpose of the present invention, the invention provides a rotational angle detecting apparatus. A relative rotational angle of a rotary body is measured with respect to a reference angle. The apparatus includes a disk, a first group of openings, a first detecting element, a computing means, a second group of openings, a second detecting element, a memory, and a determining means. The disk is coaxial with the rotary body. The disk rotates integrally with the rotary body. The first group of openings includes a plurality of openings arranged about the entire circumference of the disk and spaced from one another by a predetermined pitch. The openings of the first group are used for detecting the relative rotational angle. The first detecting element detects openings of the first group and generates a first binary code. The computing means computes the relative rotational angle of the rotary body in accordance with the first binary code. The second group of openings includes a plurality of openings arranged concentrically with the first group. The openings of the second group are located relative to one another in accordance with a predetermined arrangement. The second detecting element detects openings of the second group and generates a second binary code. The memory stores a combination of the first binary code and the second binary code in correspondence with angle data. The determining means determines the reference angle in accordance with the combination of the first and second binary codes stored by the memory when the first detecting element generates a predetermined binary code.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A rotational angle detecting apparatus 1 of an embodiment according to the present invention will be now described with reference to FIGS. 1 to 5. The rotational angle detecting apparatus 1 detects the rotational angle of a vehicle steering wheel.

Figure 1:
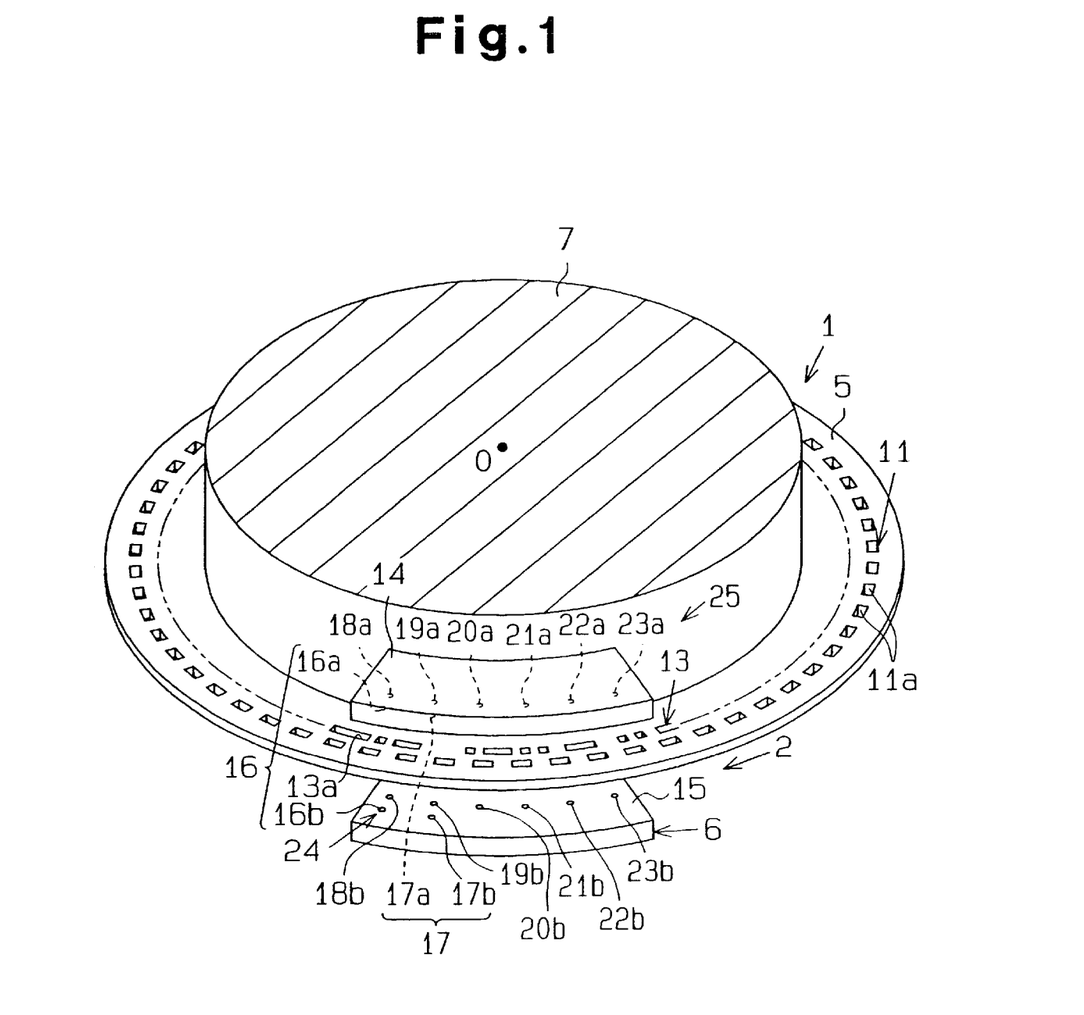
FIG. 1 is a perspective view showing a rotational angle detecting apparatus according to the present invention.
Figure 4:
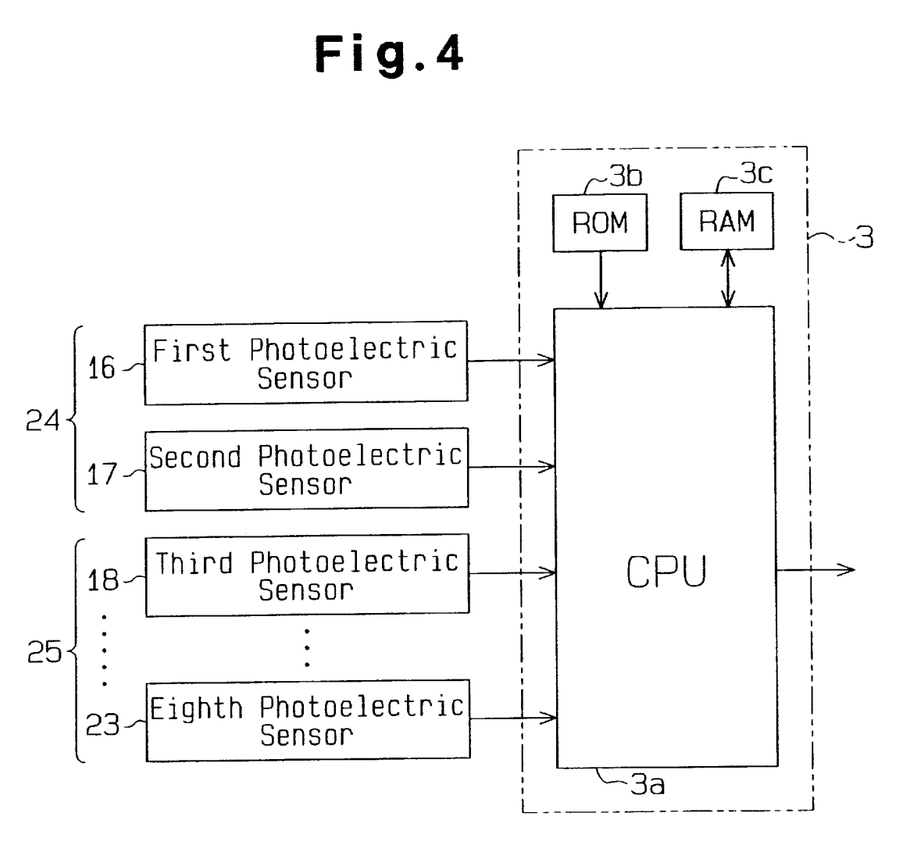
FIG. 4 is a block diagram showing the electric configuration of the rotational angle detecting apparatus of FIG. 1.

The rotational angle detecting apparatus 51 includes a detector 2, as shown in FIG. 1, and a computing portion 3, as shown in FIG. 4. The detector 2 detects the rotational angle of the steering wheel and generates a detection signal. The computing portion 3 computes the rotational angle of the steering wheel in accordance with the detection signal from the detector 2.

As shown in FIG. 1, the detector 2 includes a rotary disk 5 and a detecting member 6. The rotary disk 5 is formed of non-transparent synthetic resin. The rotary disk 5 is secured to a steering shaft 7. The rotary disk 5 thus rotates around the axis O integrally with the steering shaft 7.

Figure 2:
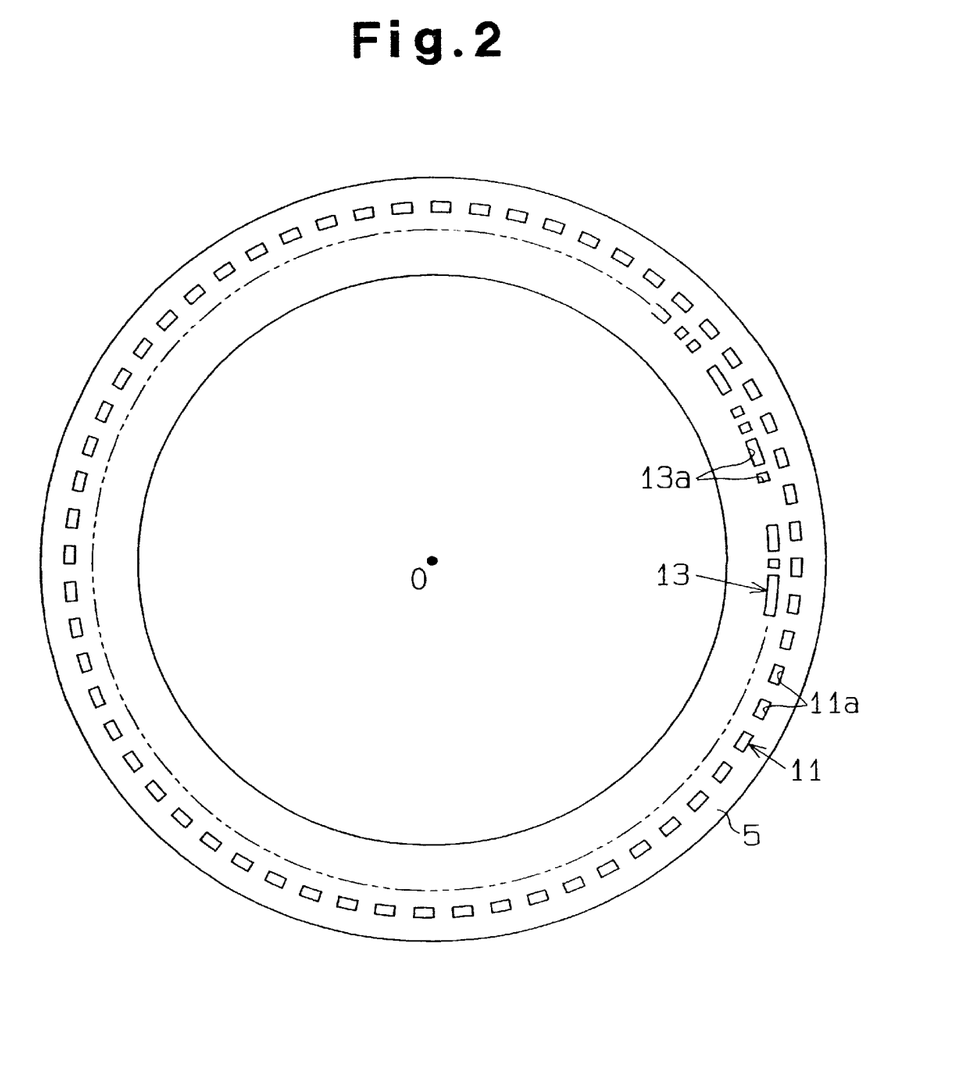
FIG. 2 is a plan view showing a rotary disk of the rotational angle detecting apparatus of FIG. 1.
Figure 3:
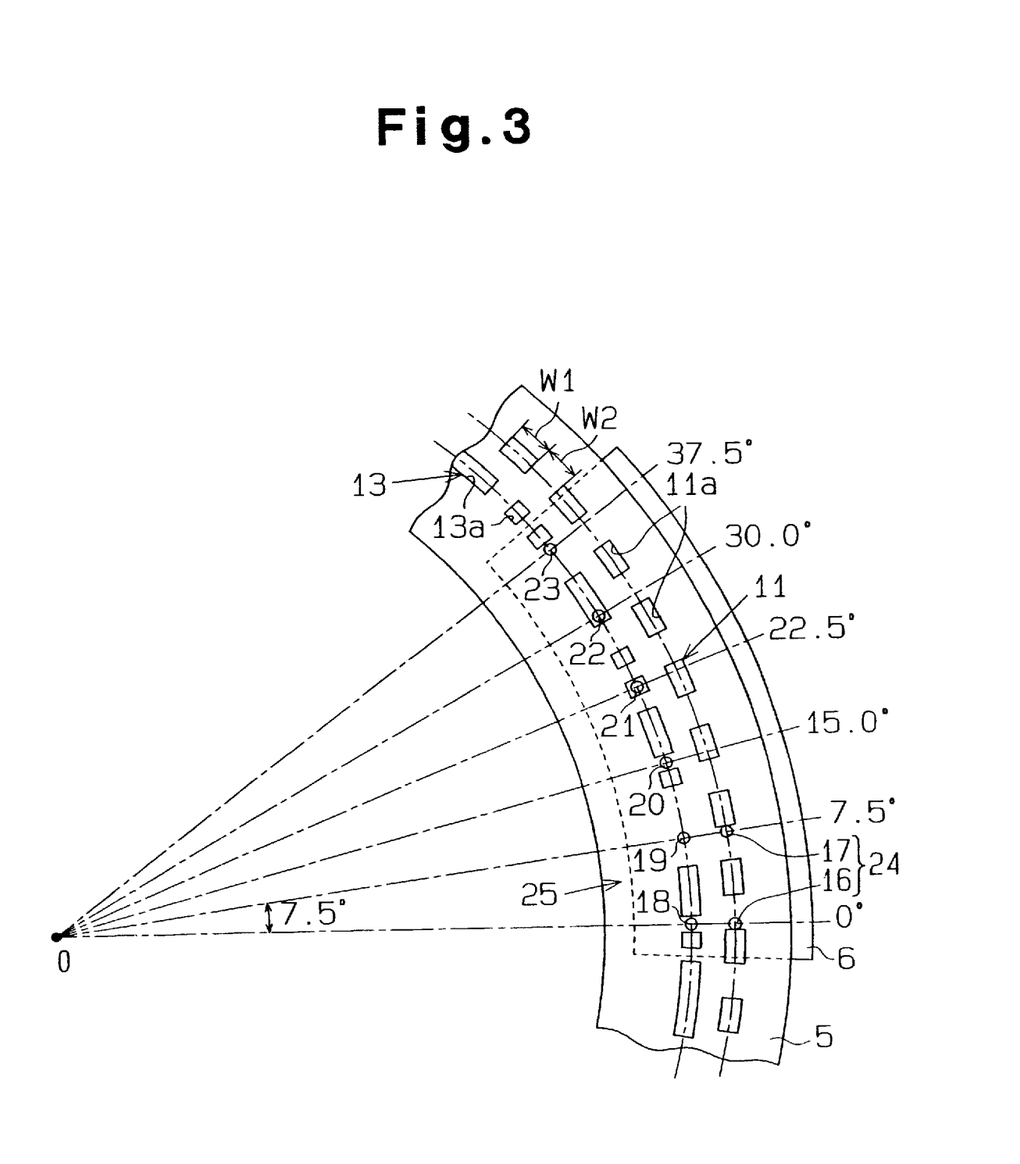
FIG. 3 is an enlarged plan view showing a portion of the rotary disk of FIG. 2.

As shown in FIGS. 1 and 2, the rotary disk 5 includes a first opening group 11 that is located along a circle with a predetermined radius with respect to the axis O. The first opening group 11 includes a plurality of (in this embodiment, sixty) openings 11a that extend through the rotary disk 5. The openings 11a are spaced from one another at equal intervals. As shown in FIG. 3, each opening 11a has a substantially square shape. The circumferential dimension W1 of each opening 11a is equal to the circumferential interval W2 between adjacent openings 11a.

The rotary disk 5 includes a second opening group 13. The second opening group 13 is located along a circle located radially inward from and coaxial with the circle along which the first opening group 11 is located. The second opening group 13 includes a plurality of openings 13a that extend through the rotary disk 5. Each opening 13a is spaced from an adjacent opening 13a with a predetermined interval. More specifically, the openings 13a of the second opening group 13 are located relative to one another such that a binary code corresponding to one opening 13a does not interfere with a binary code corresponding to another opening 13a when a reference angle is detected, as will be later described.

As shown in FIG. 1, the detecting member 6 includes a first detecting piece 14 and a second detecting piece 15, which oppose each other. The rotary disk 5 is located between the first and second detecting pieces 14, 15. The first and second detecting pieces 14, 15 are secured to a support member (not shown) located around the steering shaft 7. This structure prevents the first and second detecting pieces 14, 15 from rotating integrally with the steering shaft 7. Accordingly, if the rotary disk 5 rotates integrally with the steering shaft 7, the periphery of the rotary disk 5 passes between the first and second detecting pieces 14, 15.

The detecting member 6 includes first to eighth photoelectric sensors 16 to 23. More specifically, the first detecting piece 14 includes first to eighth light emitting elements 16a, 17a, 18a, 19a, 20a, 21a, 22a, 23a and the second detecting piece 15 includes first to eighth light receiving elements 16b, 17b, 18b, 19b, 20b, 21b, 22b, 23b. That is, the first to eighth light emitting elements 16a to 23a correspond to the first to eighth photoelectric sensors 16 to 23, respectively. In the same manner, the first to eighth light receiving elements 16b to 23b correspond to the first to eighth photoelectric sensors 16 to 23, respectively.

As shown in FIGS. 1 and 3, the first and second photoelectric sensors 16, 17 are located at positions corresponding to a path formed by the first opening group 11 when the rotary disk 5 rotates. The first and second photoelectric sensors 16, 17 form a relative angle detecting element 24 that detects the angle by which the steering shaft 7 is rotated relative to a reference angle. The first photoelectric sensor 16 generates a binary code depending on whether or not the rotary disk 5 blocks the first light emitting element 16a from the first light receiving element 16b. In the same manner, the second photoelectric sensor 17 generates a binary code depending on whether or not the rotary disk 5 blocks the second light emitting element 17a from the second light receiving element 17b. That is, the relative angle detecting element 24 generates a two-bit code depending on whether or not each photoelectric sensor 16, 17 faces an opening 11a. The first and second photoelectric sensors 16, 17 are located relative to each other such that the phase of a binary code generated by the second photoelectric sensor 17 is offset from the phase of a binary code generated by the first photoelectric sensor 16 by one quarter cycle. Accordingly, like the prior art rotational angle detecting apparatus 51, the relative angle detecting element 24 successively generates two-bit codes, or "1•1", "0•1", "0•0", and "1•0" in this order in a repeated manner, when the rotary disk 5 rotates in the direction indicated by arrow F of FIG. 1. In other words, every time a two-bit code is replaced by a subsequent signal, only a single digit of the signal is changed. That is, the two-bit codes are generated in accordance with a so-called alternating binary code system.

Further, as shown in FIG. 3, the first photoelectric sensor 16 is spaced from the second photoelectric sensor 17 at an angular interval of 7.5 degrees. In addition, the first opening group 11 of this embodiment has sixty openings 11a. Thus, the relative angle detecting element 24 generates a two-bit code every time the rotational angle of the rotary disk 5 is varied by 1.5 degrees.

The third to eighth photoelectric sensors 18 to 23 are located at positions corresponding to a path formed by the second opening group 13 when the rotary disk 5 rotates. The third to eighth photoelectric sensors 18 to 23 form a position data detecting element 25. As shown in FIG. 3, the third photoelectric sensor 18 is located on the radius of the first photoelectric sensor 16. The fourth photoelectric sensor 19 is located on the radius of the second photoelectric sensor 17. The fifth to eighth photoelectric sensors 20 to 23 are arranged next to the fourth photoelectric sensor 19 in this order. In this state, adjacent sensors of the fifth to eighth sensors 20 to 23 are spaced from each other by a circumferential interval equal to the circumferential distance between the third photoelectric sensor 18 and the fourth photoelectric sensor 19. The third to eighth photoelectric sensors 18 to 23 each generate a binary code depending on whether or not the rotary disk 5 blocks the associated light emitting element 18a to 23a from the light receiving element 18b to 23a. That is, the position data detecting element 25 generates a six-bit code depending on whether or not each photoelectric sensor 18 to 23 faces an opening 13a of the second opening group 13.

As shown in FIG. 4, the relative angle detecting element 24 and the position data detecting element 25 each output a signal to the computing portion 3. The computing portion 3 includes a central processing unit (CPU) 3a, a read only memory (ROM) 3b, and a random access memory (RAM) 3c. The ROM 3b stores a program executed by the CPU 3a to compute the rotational angle of the rotary disk 5. The RAM 3c temporarily stores the value computed by the CPU 3a. The ROM 3b also stores angle data corresponding to each rotational angle. The angle data includes the binary codes generated by the first to eighth photoelectric sensors 16 to 23 when the relative angle detecting element 24 detects that the rotary disk 5 is rotated at a reference angle.

The CPU 3a first computes the reference angle and then obtains a relative angle measured from the reference angle.

Figure 5:
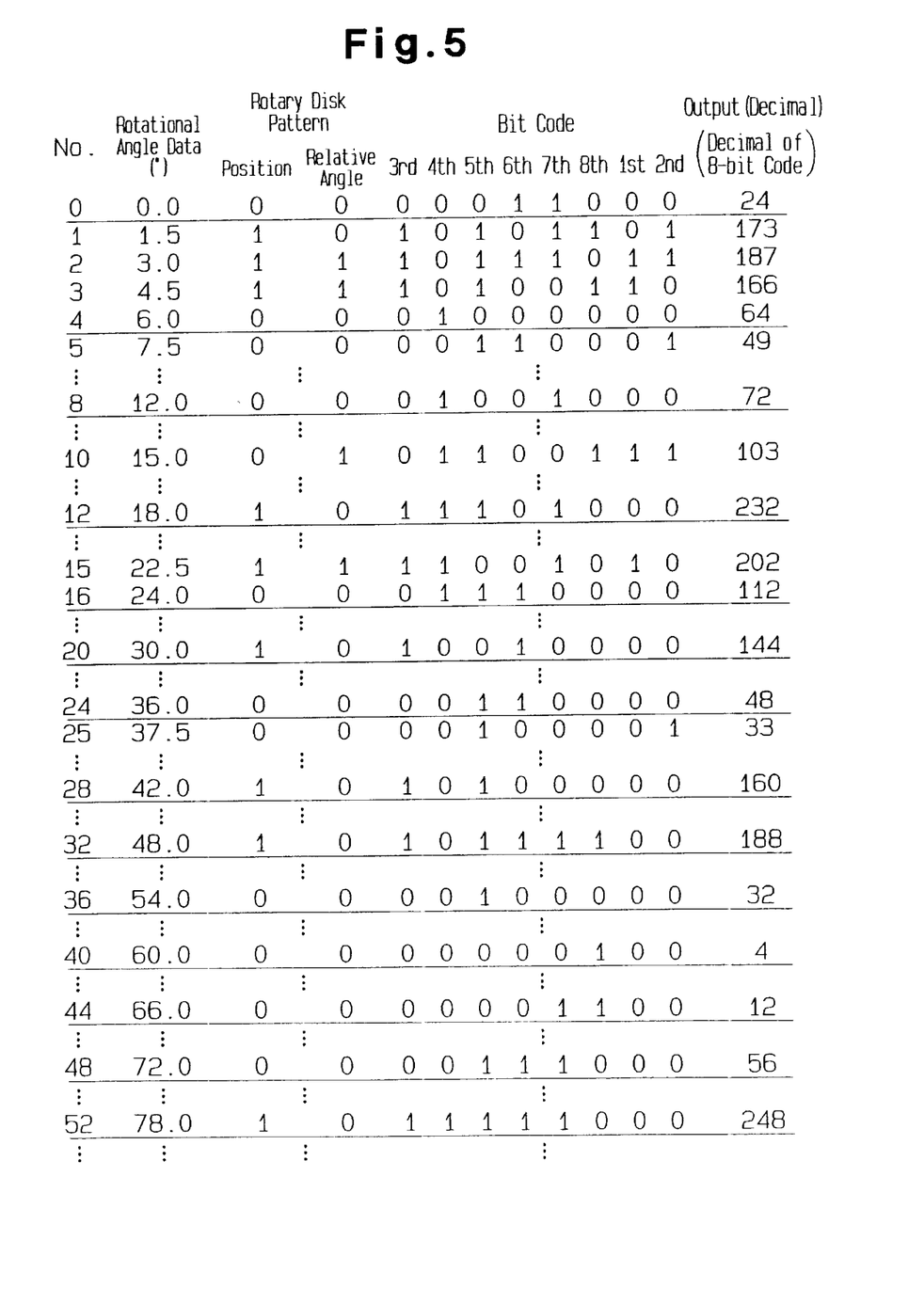
FIG. 5 is a bit map table indicating binary codes that are generated by detecting means of the rotational angle detecting apparatus of FIG. 1.

In other words, the CPU 3a first activates the relative angle detecting element 24 to determine the reference angle. When the relative angle detecting element 24 generates the two-bit code "0•0", the CPU 3a activates the position data detecting element 25. When the relative angle detecting element 24 generates the two-bit code "0•0", the rotational angle of the rotary disk 5 is zero degrees, six degrees, twelve degrees, and so on, as shown in FIG. 5. That is, the reference angle of the rotary disk 5 is detected every six degrees with respect to zero degrees. The CPU 3a then computes the reference angle in accordance with the binary codes generated by the third to eighth photoelectric sensors 18 to 23 with reference to the angle data stored in the ROM 3b. More specifically, the binary codes generated by the first to eighth photoelectric sensors 16 to 23 are treated as an eight-bit code. In the eight-bit code, the binary codes generated by the position data detecting element 25 correspond to upper places, and the binary codes generated by the relative angle detecting element 24 correspond to lower places. The CPU 3a converts the eight-bit code to a decimal number, thus obtaining a decimal output, as shown in FIG. 5. The angle data stored by the ROM 3b includes an angle corresponding to each decimal output value. Thus, the CPU 3a determines the reference angle based on the decimal output with reference to the angle data of the ROM 3b. In this embodiment, the reference angle is zero degrees when the decimal output is "24". In other words, when the two-bit code generated by the relative angle detecting element 24 is "0•0" and the six-bit code generated by the position data detecting element 25 is "0•0•0•1•1•0", the CPU 3a determines that the reference angle is zero degrees. Likewise, when any other "0•0" position of the rotary disk 5 is detected, the CPU 3a computes the reference angle in accordance with the binary codes generated by the first to eighth photoelectric sensors 16 to 23 with reference to the angle data stored by the ROM 3b.

Subsequently, when the rotary disk 5 is rotated from the reference angle position, the CPU 3a computes a relative angle in accordance with the two-bit codes generated by the relative angle detecting element 24. More specifically, as shown in FIG. 5, when the rotary disk 5 is located at a position corresponding to the reference angle of zero degrees, the two-bit code generated by the relative angle detecting element 24 is "0•0". Thus, if the code generated by the relative angle detecting element 24 is changed to "0•1", the CPU 3a determines that the rotary disk 5 is rotated by 1.5 degrees from the reference angle. That is, the CPU 3a determines that the relative angle, or the rotational angle of the rotary disk 5, is 1.5 degrees.

When the operation of the rotational angle detecting apparatus 1 is initiated by, for example, supplying power to the rotational angle detecting apparatus 1, the reference angle of the rotary disk 5 is first determined. More specifically, the relative angle detecting element 24 detects whether or not each photoelectric sensor 16, 17 faces an opening 11a of the first opening group 11. In this state, only the relative angle detecting element 24 is activated, and the position data detecting element 25 is de-activated. If the two-bit code generated by the relative angle detecting element 24 becomes "0•0", the position data detecting element 25 is activated to determine the reference angle. In other words, when initiating its operation, the rotational angle detecting apparatus 1 initially determines the reference angle of the rotary disk 5. After completing the initializing step, the rotational angle detecting apparatus 1 activates only the relative angle detecting element 24. The relative angle detecting element 24 thus generates a two-bit code depending on whether or not the relative angle detecting element 24 faces an opening 11a of the first opening group 11. The CPU 3a of the rotational angle detecting apparatus 1 then computes the relative angle, or the rotational angle of the rotary disk 5 with respect to the reference angle determined in the initializing step, in accordance with the two-bit code generated by the relative angle detecting element 24.

In other words, once the rotational angle detecting apparatus 1 determines the reference angle of the rotary disk 5 in the initializing step, the rotational angle of the rotary disk 5 is computed with respect to the determined reference angle.

In the illustrated embodiment, it is detected that the rotary disk 5 is at a reference angle determination position every six degrees of rotation of the rotary disk 5. Thus, the maximum angle by which the steering shaft 7 must be rotated to detect the reference angle is six degrees. That is, the reference angle is determined without rotating the steering shaft 7 by a relatively large angle. This makes it easy for the rotational angle detecting apparatus 1 to determine the reference angle of the rotary disk 5 when initiating its operation, or to initialize the rotational angle of the rotary disk 5.

The position data detecting element 25 is activated only when the reference angle of the rotary disk 5 is determined. That is, the position data detecting element 25 is de-activated when the relative angle detecting element 24 determines the rotational angle of the rotary disk 5. This structure reduces the power consumption of the rotational angle detecting apparatus 1.

The rotational angle detecting apparatus 1 determines that the rotary disk 5 is rotated to a reference angle determining position when the two-bit code generated by the relative angle detecting element 24 is "0•0". Thus, the position data detecting element 25 is activated only in this state to compute the reference angle of the rotary disk 5. In other words, if the two-bit code generated by the relative angle detecting element 24 is other than "0•0", for example, "0•1", the rotational angle, or the reference angle, of the rotary disk 5 is detected without activating the position data detecting element 25. Accordingly, compared to a case in which the position data detecting element 25 is constantly activated to detect the rotational angle of the rotary disk 5, the power consumption of the rotational angle detecting apparatus 1 is decreased.

Among the first and second opening groups 11 to 13, the first opening group 11 is outermost on the rotary disk 5. Thus, the circumference of the circle along which the first opening group 11 is located is greater than that of the second group 13. This structure increases the number of the openings 11a of the first opening group 11, which are used for determining the relative angle, or the rotational angle of the rotary disk 5. Accordingly, the resolution of the rotational angle detecting apparatus 1 is improved.

It should be apparent to those skilled in the art that the present invention may be embodied in many other specific forms without departing from the spirit or scope of the invention. Particularly, it should be understood that the invention may be embodied in the following forms.

Although the first opening group 11 is located radially outermost in the illustrated embodiment, the second opening group 13 may be outermost. That is, the positions of the first and second opening groups 11, 13 may be reversed.

Therefore, the present examples and embodiments are to be considered as illustrative and not restrictive and the invention is not to be limited to the details given herein, but may be modified within the scope and equivalence of the appended claims.

What is claimed is:

1. A rotational angle detecting apparatus, wherein a relative rotational angle of a rotary body is measured with respect to a reference angle, the apparatus comprising:

a disk, which is coaxial with the rotary body, wherein the disk rotates integrally with the rotary body;

a first group of openings, wherein the first group of openings includes a plurality of openings arranged about the entire circumference of the disk and spaced from one another by a predetermined pitch, wherein the openings of the first group are used for detecting the relative rotational angle;

a first detecting element, which detects openings of the first group and generates a first binary code;

a computing means for computing the relative rotational angle of the rotary body in accordance with the first binary code;

a second group of openings, wherein the second group of openings includes a plurality of openings arranged concentrically with the first group, wherein the openings of the second group are located relative to one another in accordance with a predetermined arrangement;

a second detecting element, which detects openings of the second group and generates a second binary code;

a memory, which stores a combination of the first binary code and the second binary code in correspondence with angle data;

said computing means includes a determining means for determining the reference angle in accordance with the first and the second binary codes and the combination of the first and second binary codes stored by the memory when the first detecting element generates a predetermined binary code;

said second detecting element being arranged to actuate only when the reference angle of the rotary body is determined; and said second detecting element being actuated when the first detecting element generates the predetermined binary code.

2. The apparatus as set forth in claim 1, wherein the relative rotational angle computed by the computing means is initialized every time the reference angle is determined.

3. The apparatus as set forth in claim 1, wherein the circumferential dimension of each opening of the first opening group is equal to the circumferential distance between adjacent openings of the first group.

4. The apparatus as set forth in claim 3, wherein the first detecting element includes first and second, photoelectric sensors, and the phase of a signal generated by the second photoelectric sensor is offset from the phase of a signal generated by the first photoelectric sensor by one quarter cycle.

5. The apparatus as set forth in claim 2, wherein the reference angle is determined each time the disk rotates by six degrees.

6. The apparatus as set forth in claim 1, wherein the first group is outward of the second group.

7. The apparatus as set forth in claim 1, wherein the reference angle of the rotary body is determined based on the first and the second binary codes and the predetermined data relating to the combination of the first and the second binary codes, and the first detecting element is solely actuated to compute the relative rotational angle of the rotary body based on the first binary code.

8. A rotational angle detecting apparatus, wherein a relative rotational angle of a rotary body is measured with respect to a reference angle, the apparatus comprising:

a disk, which is coaxial with the rotary body, wherein the disk rotates integrally with the rotary body;

a first group of openings, wherein the first group of openings includes a plurality of openings arranged about the entire circumference of the disk and spaced from one another by a predetermined pitch, wherein the openings of the first group are used for detecting the relative rotational angle;

a first detecting element, which detects openings of the first group and generates a first binary code;

a computing means for computing the relative rotational angle of the rotary body in accordance with the first binary code;

a second group of openings, wherein the second group of openings includes a plurality of openings arranged concentrically with the first group, wherein the openings of the second group are located relative to one another in accordance with a predetermined arrangement;

a second detecting element, which detects openings of the second group and generates a second binary code;

a memory, which stores a combination of the first binary code and the second binary code in correspondence with angle data;

said computing means includes a determining means for determining the reference angle in accordance with the first and the second binary codes and the combination of the first and second binary codes stored in the memory when the first detecting element generates a predetermined binary code;

said second detecting element being arranged to actuate only when the reference angle of the rotary body is determined; and said second detecting element being actuated when the first detecting element generates the predetermined binary code.

9. The apparatus as set forth in claim 8, wherein a circumferential dimension of each opening of the first opening group is equal to an interval between adjacent openings of the first opening group.

10. The apparatus as set forth in claim 9, wherein the first detecting element includes first and second, translucent type photoelectric sensors, and the phase of a signal generated by the second photoelectric sensor is offset from the phase of a signal generated by the first photoelectric sensor in accordance with a quarter cycle.

11. The apparatus as set forth in claim 8, wherein the first opening group is located radially outward from the second opening group.

12. The apparatus as set forth in claim 8, wherein said second detecting element is actuated only when the reference angle of the rotary body is determined.

13. The apparatus as set forth in claim 8, wherein the reference angle of the rotary body is determined based on the first and the second binary codes and the predetermined data relating to the combination of the first and the second binary code and the first detecting element is solely actuated to compute the relative rotational angle of the rotary body based on the first binary code.

* * * * *